US012571631B2

(12) United States Patent
Kikuchi et al.

(10) Patent No.: US 12,571,631 B2
(45) Date of Patent: Mar. 10, 2026

(54) SURVEYING INSTRUMENT

(71) Applicant: TOPCON CORPORATION, Tokyo (JP)

(72) Inventors: Masaho Kikuchi, Tokyo (JP); Masahiro Ohishi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 334 days.

(21) Appl. No.: 18/125,591

(22) Filed: Mar. 23, 2023

(65) Prior Publication Data

US 2023/0349695 A1    Nov. 2, 2023

(30) Foreign Application Priority Data

Mar. 30, 2022    (JP) ................................. 2022-057725

(51) Int. Cl.
*G01B 11/06*        (2006.01)
*G01C 15/00*        (2006.01)
(52) U.S. Cl.
CPC ........ *G01C 15/006* (2013.01); *G01B 11/0608* (2013.01)
(58) Field of Classification Search
CPC ........................... G01C 15/006; G01B 11/0608
(Continued)

(56) References Cited

U.S. PATENT DOCUMENTS 4,056,311 A    11/1977    Winthrop
5,291,262 A    3/1994    Dunne
(Continued)

FOREIGN PATENT DOCUMENTS

CN        101153796 A        4/2008
CN        205067877 U        3/2016
(Continued)

OTHER PUBLICATIONS

José L. García-Balboa et al. "A Field Procedure for the Assessment of the Centring Uncertainty of Geodetic and Surveying Instruments" sensors, 2018, pp. 1-16, 18, 3187, doi: 10.3390/s18103187.
(Continued)

*Primary Examiner* — Laura Martin
(74) *Attorney, Agent, or Firm* — Studebaker Brackett PLLC

(57)        ABSTRACT

In a surveying instrument including an instrument height measuring unit the instrument height measuring unit includes a light transmitting unit configured to emit light, a beam splitter configured to be incident with light emitted from the light transmitting unit, split the incident light into reference light and distance-measuring light, send the reference light to a reference light path, and send the distance-measuring light to a distance-measuring light path, a first light receiving unit configured to receive the reference light, a second light receiving unit configured to receive light being the distance-measuring light that has been emitted toward a position below the vertical axis of the surveying instrument main body and returned by being reflected by a distance-measuring object, and an arithmetic unit configured to calculate the instrument height based on a difference between light reception signals generated by the first light receiving unit and the second light receiving unit.

4 Claims, 4 Drawing Sheets

(58) Field of Classification Search
USPC ........................................................ 33/275 R
See application file for complete search history.

(56) References Cited

U.S. PATENT DOCUMENTS

| | | | |
|---|---|---|---|
| 6,137,568 | A | 10/2000 | Ohtomo et al. |
| 7,345,748 | B2 | 3/2008 | Sugiura et al. |
| 10,520,307 | B2 | 12/2019 | Ohtomo et al. |
| 10,690,497 | B2 | 6/2020 | Nagashima et al. |
| 10,823,558 | B2 | 11/2020 | Ohtomo et al. |
| 10,949,579 | B2 | 3/2021 | Wodrich et al. |
| 2008/0231830 | A1 | 9/2008 | Osada |
| 2016/0076885 | A1 | 3/2016 | Nishita |
| 2018/0003493 | A1* | 1/2018 | Bernhard ................. G01C 5/00 |
| 2018/0224277 | A1 | 8/2018 | Latova et al. |
| 2018/0356522 | A1 | 12/2018 | Kikuchi et al. |
| 2019/0011563 | A1 | 1/2019 | Hall et al. |
| 2019/0078883 | A1* | 3/2019 | Yuasa ................. G02B 27/1006 |
| 2019/0120943 | A1 | 4/2019 | Iguchi et al. |
| 2020/0166340 | A1 | 5/2020 | Hinderling |
| 2020/0386546 | A1 | 12/2020 | Ohtomo et al. |
| 2021/0123734 | A1* | 4/2021 | Yuasa ..................... G01S 17/86 |
| 2021/0285765 | A1* | 9/2021 | Yuasa ................. G01C 15/002 |
| 2021/0333408 | A1 | 10/2021 | Herter et al. |
| 2022/0091436 | A1 | 3/2022 | Wright et al. |
| 2023/0175844 | A1 | 6/2023 | Shoji et al. |
| 2023/0280160 | A1* | 9/2023 | Yuasa .................. G01S 7/4815 356/4.01 |
| 2023/0280161 | A1* | 9/2023 | Yuasa .................. G01C 15/006 356/5.01 |
| 2023/0314131 | A1* | 10/2023 | Kikuchi ............... G01S 7/4813 33/282 |
| 2023/0314135 | A1* | 10/2023 | Kikuchi ............... G01C 15/006 33/275 R |

FOREIGN PATENT DOCUMENTS

| | | | | | |
|---|---|---|---|---|---|
| EP | 2 105 705 A1 | 9/2009 | | | |
| JP | H05-064720 A | 3/1993 | | | |
| JP | H06-213664 A | 8/1994 | | | |
| JP | 2008-232881 A | 10/2008 | | | |
| JP | 2010151618 A | * | 7/2010 | ............ | G01S 17/34 |
| JP | 2018048868 A | * | 3/2018 | | |
| JP | 2019-219319 A | 12/2019 | | | |
| WO | 2008/124713 A2 | 10/2008 | | | |

OTHER PUBLICATIONS

Evangelia Lambrou et al. "Detecting the Centring Error of Geodetic Instruments Over a Ground Mark Through a Tribrach-Based Optical Plummet" Applied Geomatics, Nov. 15, 2017, pp. 237-245, vol. 9, https://doi.org/10.1007/s12518-017-0197-8.
An Office Action; mailed by the United States Patent and Trademark Office on Jul. 16, 2025, which corresponds to U. S. U.S. Appl. No. 18/125,601 and is related to the present application.
A Notice of Allowance; mailed by the United States Patent and Trademark Office on Jul. 1, 2025, which corresponds to U.S. Appl. No. 18/125,609 and is related to the present application.

* cited by examiner

SURVEYING INSTRUMENT

TECHNICAL FIELD

The present invention relates to a surveying instrument equipped with an instrument height measuring unit that makes a distance measurement and calculates an instrument height.

BACKGROUND ART

In a survey work, first, a surveying instrument main body is disposed horizontally at a position vertically above a reference point through a leveling work and a centering work, and then, an instrument height that is a height from an optical center of the surveying instrument main body to the reference point vertically below the optical center is obtained. There is provided a surveying instrument that includes a distance-measuring device for measuring the instrument height as an instrument height measuring unit, and makes a measurement by emitting distance-measuring light toward a position vertically below the surveying instrument main body and automatically calculates the instrument height.

Here, a conventional distance-measuring device will be described with reference to FIG. 4. FIG. 4 is an optical configuration diagram of the conventional distance-measuring device 940.

The distance-measuring device 940 includes a light transmitting unit 951, a collimating lens 952, a beam splitter 954 that is a dichroic prism, a light receiving unit 955, a shutter 956, and an objective lens 957. Light emitted from the light transmitting unit 951 is collimated into parallel light by the collimating lens 952, made incident on the beam splitter 954 and split into distance-measuring light L2 and reference light R2, and alternatively emitted by the shutter 956. The reference light R2 is directed toward and received by the light receiving unit 955, and the distance-measuring light L2 passes through the objective lens 957 and is emitted toward a position below a vertical axis of the surveying instrument main body, and returns by being reflected by a measuring mark 902 that is a distance-measuring object and a reference point, and is received by the light receiving unit 955. From a difference between light reception signals of the reference light R2 and the distance-measuring light L2, a distance to the object is calculated.

Here, the alternative emission of the distance-measuring light L2 and the reference light R2 by the shutter 956 is performed by movements of a switching plate (for example, Patent Literature 1). The switching plate is moved by a driving unit to block one of the two light paths through which the lights are emitted and allow passage through the other path, by which the light path of emitted light is alternatively switched between a reference light path and a distance-measuring light path.

CITATION LIST

Patent Literature

Patent Literature 1: Japanese Published Unexamined Patent Application No. 2008-232881

SUMMARY OF INVENTION

Technical Problem

However, the shutter is not an electronic component or the like but a movable switching plate, and a driving unit for moving the switching plate is also required, so that the distance-measuring device including is the shutter comparatively large in size. Because it is incorporated in the surveying instrument main body, it is desirable that the instrument height measuring unit as the distance-measuring device is compact in size.

The present invention was made in view of this, and provides a surveying instrument equipped with an instrument height measuring unit compact in size.

Solution to Problem

In order to solve the problem described above, in an aspect of the present disclosure, a surveying instrument including an instrument height measuring unit configured to make a distance measurement by irradiating light toward a position below a vertical axis of a surveying instrument main body and calculate an instrument height is configured such that the instrument height measuring unit includes a light transmitting unit configured to emit light, a beam splitter configured to be incident with light emitted from the light transmitting unit, split the incident light into reference light and distance-measuring light, send the reference light to a reference light path, and send the distance-measuring light to a distance-measuring light path, a first light receiving unit configured to receive the reference light, a second light receiving unit configured to receive light being the distance-measuring light that has been emitted toward a position below the vertical axis of the surveying instrument main body and returned by being reflected by a distance-measuring object, and an arithmetic unit configured to calculate the instrument height based on light reception signals generated by the first light receiving unit and the second light receiving unit.

According to this aspect, two light receiving units are used, and reference light is received by the first light receiving unit, and distance-measuring light is received by the second light receiving unit, and the reference light path and the distance-measuring light path are different from each other, so that alternatively switching between the reference light path and the distance-measuring light path by using the shutter is no longer necessary. The shutter and the driving unit for driving the shutter become unnecessary, so that the instrument height measuring unit can be made more compact in size than a conventional one. Further, the conventional technology has a problem in which a distance measurement cannot be performed during switching of the light paths by the shutter, however, by using the two light receiving units, the time for switching light paths is eliminated, and measurement results can be successively output. Additionally, the distance-measuring device using light employs the Time-of-Flight method (ToF method) in which a distance is calculated by using a difference between a time until reference light is received and a time until distance-measuring light is received, and the Time-of-Flight method includes a Direct ToF method (dToF method) in which a difference in time until detection of reflected light is simply measured, and an Indirect ToF method (iTOF method) in which a distance is calculated from a phase difference. In a distance-measuring device using a shutter, the iToF method is preferable, however, in the instrument height measuring unit configured as described above, no shutter is used, so that either the dToF method or the iToF method can be used.

Further, in an aspect, a configuration is provided such that the light emitted by the light transmitting unit is visible laser light, and the distance-measuring light is irradiated as a laser centering point toward a position below the vertical axis of the surveying instrument main body. According to this aspect, visible light irradiated vertically downward can be used as a laser centering point, and a centering work can be performed with reference to the laser centering point as a guide.

Further, in an aspect, a configuration is provided such that light receiving elements of the first light receiving unit and the second light receiving unit have temperature character- istics that are equivalent to each other. Optical elements used as the light receiving units have temperature characteristics, that is, temperature change characteristics of photoelectric conversion and the temperature characteristics differ depending on each of the optical elements. By receiving distance-measuring light and reference light by one light receiving element, this difference in the characteristics can be accurately canceled, however, there is a great difference in light reception signal amount between the reference light and distance-measuring light (light reflected by a distance- measuring object), so that a measurement range is limited. In order to solve this problem, filtering is applied by using an application and/or a component for making a light emission amount variable, however, this increases the number of components, and also increases the size of the distance- measuring device. In the configuration of the present inven- tion, although two light receiving units are used, signal processing is performed by using light receiving elements having equivalent temperature characteristics to each other for each of the light receiving units, so that a circuit scale can be made smaller.

Advantageous Effects of Invention

As is clear from the description above, a surveying instrument equipped with an instrument height measuring unit compact in size can be provided.

DESCRIPTION OF EMBODIMENTS

Hereinafter, detailed embodiments of the present inven- tion will be described with reference to the drawings. The embodiments do not limit the invention but are illustrations, and all features described in the embodiments and combi- nations of the features are not necessarily essential for the present invention. In the following description of embodi- ments and modifications, the same configurations are pro- vided with the same reference signs, and overlapping description will be omitted as appropriate.
(Surveying Instrument 1)

Figure 1:
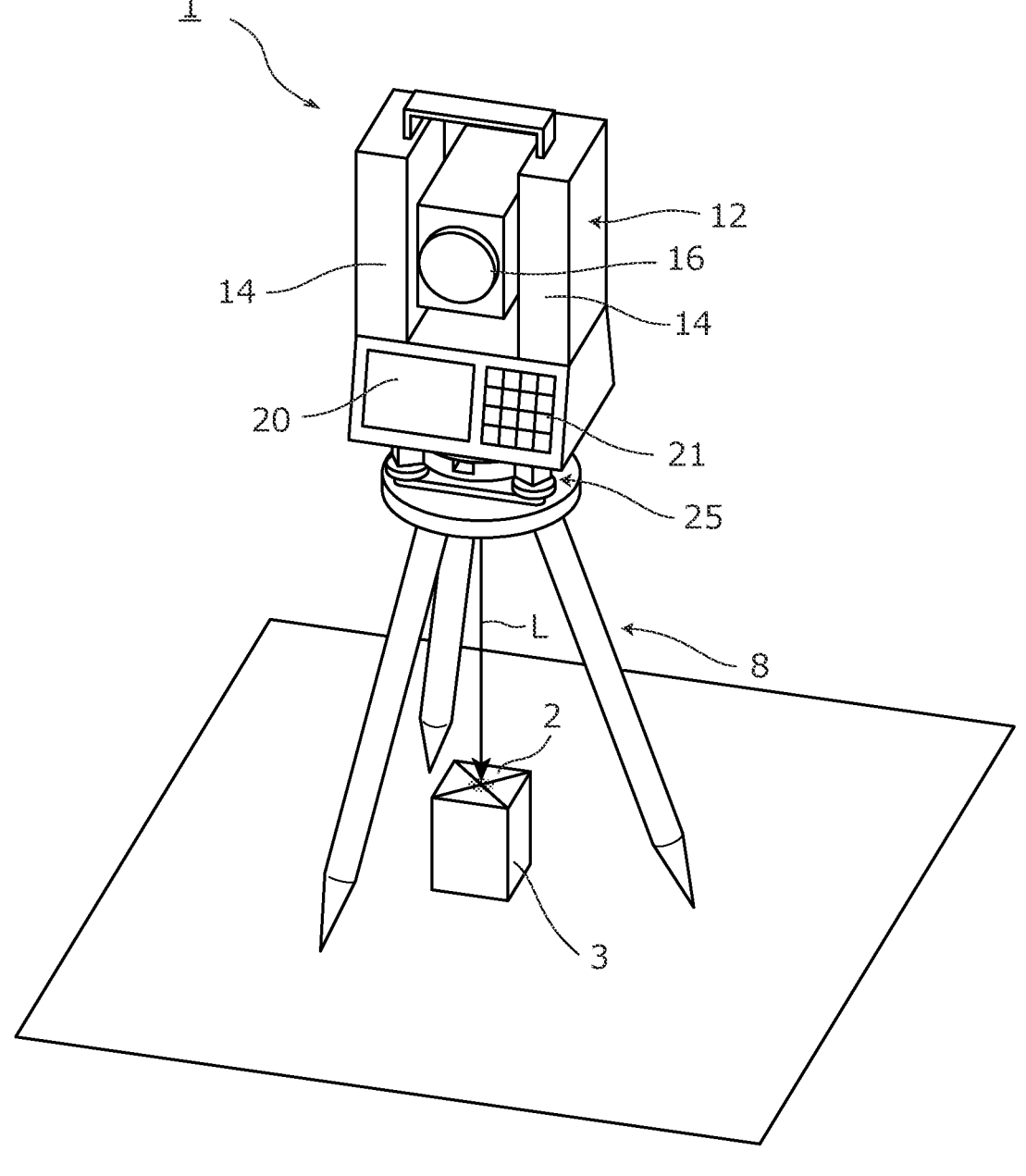
FIG. 1 is a perspective view of a surveying instrument and a measuring mark according to a preferred embodiment of the present invention.
Figure 2:
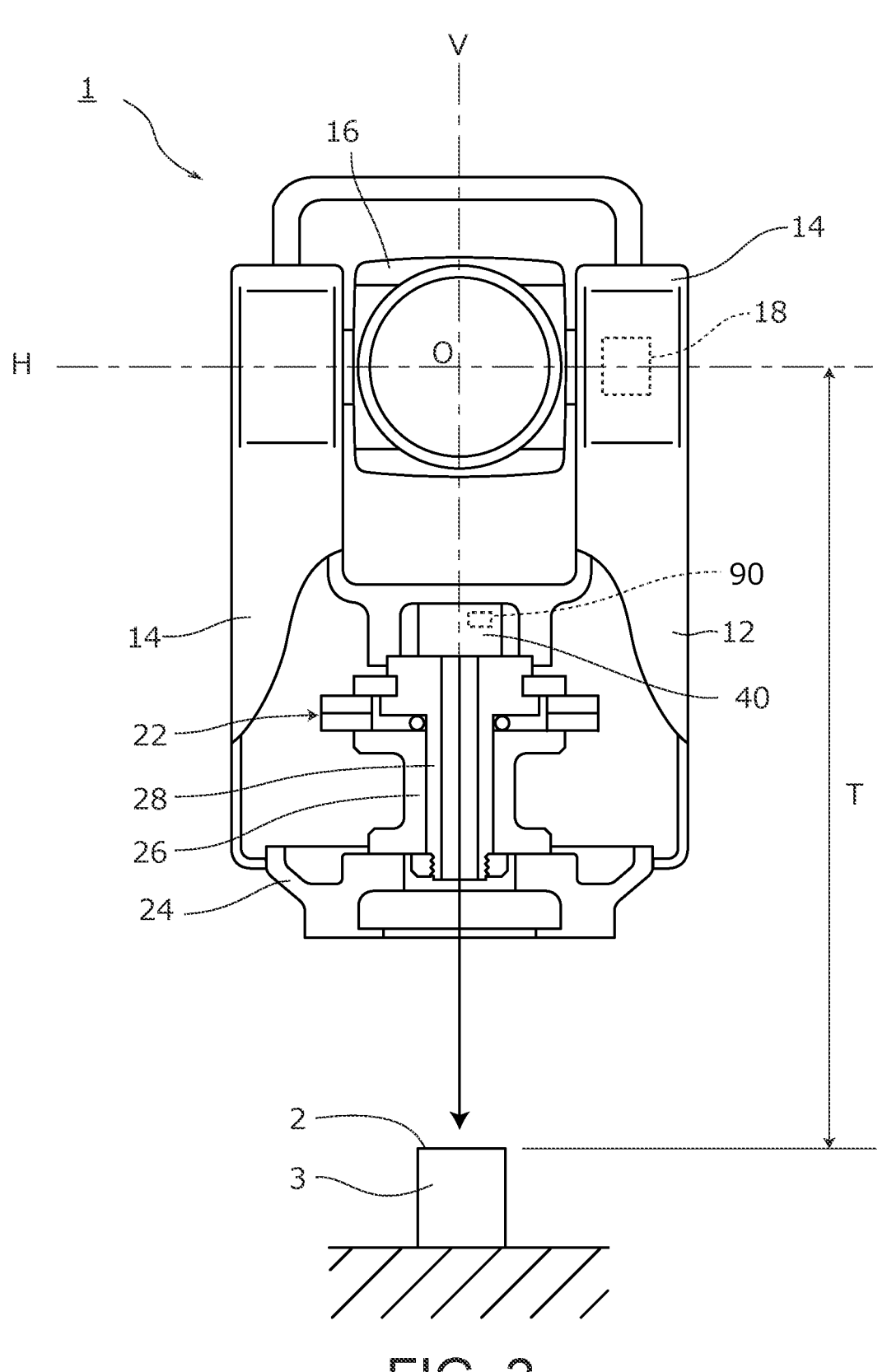
FIG. 2 is an explanatory view illustrating a schematic configuration of the same surveying instrument and mea- suring mark, and is a partially cut-away view.

FIG. 1 is a perspective view of a surveying instrument 1 and a measuring mark 2 according to a preferred embodi- ment of the present invention. FIG. 2 is an explanatory view illustrating a schematic configuration of the surveying instrument 1 and the measuring mark 2. FIG. 2 is a partially cut-away view.

The surveying instrument 1 is a total station having distance-measuring and angle-measuring functions. The measuring mark 2 is a survey reference point, and is provided on the point of a stone marker 3.

The surveying instrument 1 includes a main body casing 12 as a housing of the surveying instrument. The main body casing 12 corresponds to the surveying instrument main body in Claims of the present application. The main body casing 12 includes two supporting posts 14, and between the two supporting posts 14, a collimating telescope 16 is axially supported turnably around a horizontal axis H.

On a lower portion of the main body casing 12, a display 20 and an operation key group 21 are disposed. The display 20 displays necessary information on a screen. The opera- tion key group 21 is input means for inputting necessary setting conditions and commands.

Further, the main body casing 12 is disposed on a leveling base 25, and the leveling base 25 is fixed to a tripod 8 in a state where the leveling base 25 is placed on the tripod 8.

On a fixation portion 24 at a lower portion of the main body casing 12, a shaft cylinder 26 is disposed. Inside the shaft cylinder 26, a vertical shaft 28 provided vertically in the main body casing 12 is inserted, and axially supported turnably on the fixation portion 24 via a ball bearing. Accordingly, the main body casing 12 is turnable around the vertical shaft 28 with respect to the fixation portion 24. The leveling base 25 has an adjust screw for finely adjusting a tilt, and the fixation portion 24 is fixed onto the adjust screw. By turning of the adjust screw, the surveying instrument 1 is adjusted to be horizontal.

At an upper end portion of the shaft cylinder 26 and an upper end portion of the vertical shaft 28, flange portions facing each other are formed, and here, a rotary encoder 22 is provided. The rotary encoder 22 is a horizontal angle sensor, and detects a rotation amount of the main body casing 12.

The vertical shaft 28 is formed into a hollow cylindrical shape, and an extension of a centerline V of the vertical shaft 28 intersects the horizontal axis H orthogonally. The orthogonal intersection point between the horizontal axis H and the centerline V is set as a center point O of the surveying instrument 1. Since the main body casing 12 axially sup- porting the collimating telescope 16 turns around the cen- terline V, by an angle sensor 18 provided on the horizontal axis H and the rotary encoder 22 described above, a rotation amount of the collimating telescope 16 around the horizontal axis H and a rotation amount around the centerline V are detected. That is, the centerline V is a vertical axis of the surveying instrument main body.

Above the vertical shaft 28, an instrument height mea- suring unit 40 for calculating an instrument height T of the surveying instrument 1 is disposed. The instrument height measuring unit 40 is a non-prism electro-optical distance measuring device which emits distance-measuring light L to a distance-measuring object, and analyzes reflected and returned light to measure a distance to the distance-measur- ing object. An optical axis of the instrument height measur- ing unit 40 is configured to match the centerline V, and the distance-measuring light L emitted from the instrument height measuring unit 40 passes through a hollow portion of the vertical shaft 28 and is emitted downward from a bottom surface of the surveying instrument 1.

(Instrument Height Measuring Unit 40)

Figure 3:
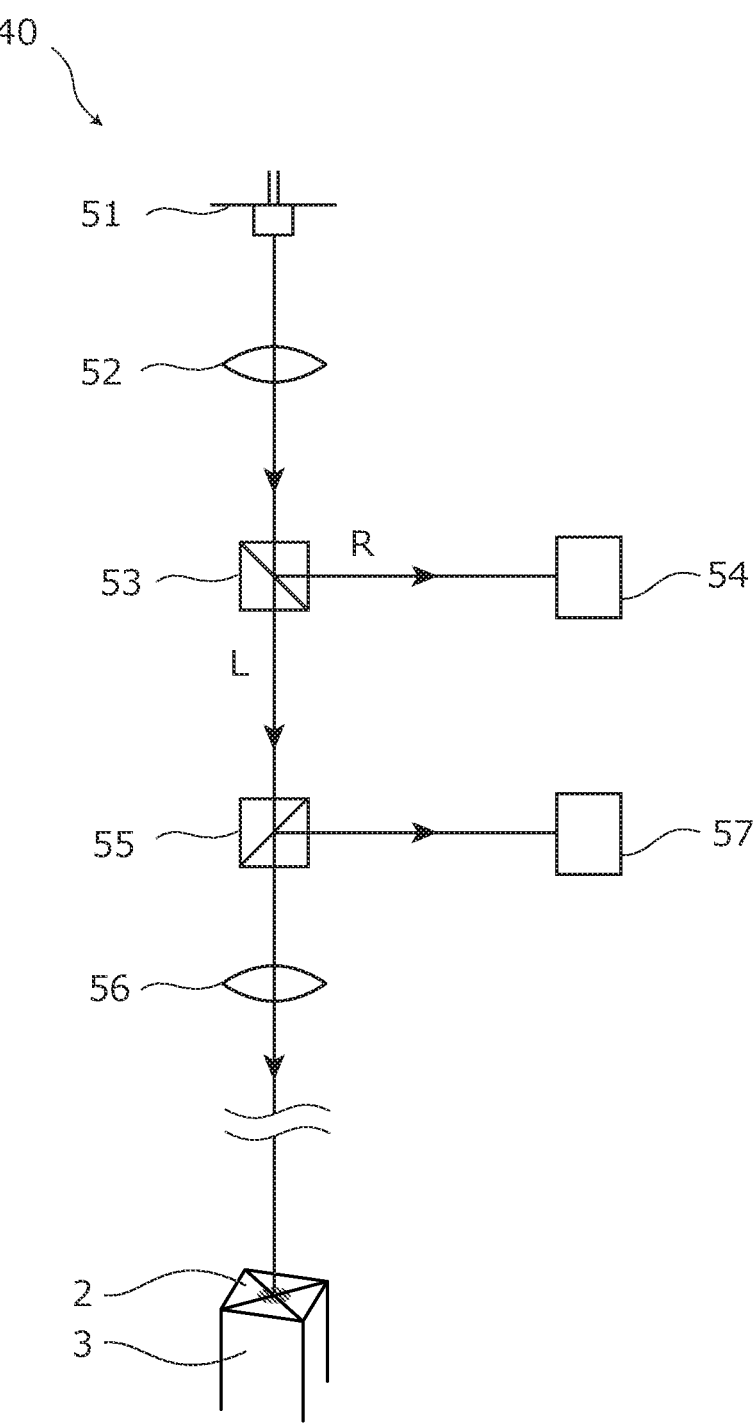
FIG. 3 illustrates an optical configuration of an instrument height measuring unit.

FIG. 3 is a configuration diagram of an optical system of the instrument height measuring unit 40.

The instrument height measuring unit 40 includes a light transmitting unit 51, a collimating lens 52, a beam splitter 53, a first light receiving unit 54, a half mirror 55, an objective lens 56, and a second light receiving unit 57.

The light transmitting unit 51 is a light source that emits visible laser light, and consists of a laser diode (LD). The collimating lens 52 is disposed in front of the light transmitting unit 51, and light emitted from the light transmitting unit 51 is collimated into parallel light by the collimating lens 52. An optical axis of the collimating lens 52 is configured to match the centerline V and so that the optical axis line passes through the center point O of the surveying instrument 1. The beam splitter 53, the half mirror 55, and the objective lens 56 are disposed in order on the optical axis of the collimating lens 52.

The beam splitter 53 is an optical member that consists of a dichroic prism, and splits light by reflecting a portion of incident light and causing the remaining portion to pass through. The light that has been emitted from the collimating lens 52 is made incident on the beam splitter 53 and split into reference light R and distance-measuring light L. The reference light R is sent to a reference light path leading to the first light receiving unit 54 and received by the first light receiving unit 54. The distance-measuring light L is sent to a distance-measuring light path through which light passes as it is and travels toward the half mirror 55.

The distance-measuring light L that has traveled toward the half mirror 55 passes through the half mirror 55 as it is, travels toward the objective lens 56, passes through the same, and is emitted toward a position below the vertical axis of the surveying instrument main body. Then, the distance-measuring light L is reflected by a distance-measuring object (in the present embodiment, a measuring mark 2) below the surveying instrument 1 and returns to the surveying instrument 1 following the same course, and is then reflected by the half mirror 55 and travels toward the second light receiving unit 57, and is received by the second light receiving unit 57.

The instrument height measuring unit 40 includes an arithmetic unit 90. The first light receiving unit 54 and the second light receiving unit 57 consist of Avalanche photodiodes (APDs), and light reception signals generated by the first light receiving unit 54 and the second light receiving unit 57 are output to the arithmetic unit 90 (refer to FIG. 2). The arithmetic unit 90 is a microcomputer including a memory and a CPU. An analysis program is stored in the memory. The arithmetic unit 90 analyzes light reception signals generated by the first light receiving unit 54 and the second light receiving unit 57, and obtains a distance to the measuring mark 2 from a difference between the light reception signals. A disposition relationship between the center point O of the surveying instrument 1 and the optical members of the instrument height measuring unit 40 (particularly a light transmission point of the light transmitting unit 51) is grasped, and by adding a height from the center point O to the instrument height measuring unit 40 to a distance measurement result, an instrument height T is calculated. The calculated instrument height T is displayed on the display 20.

(Calculation Method)

Here, a distance calculation method of the instrument height measuring unit 40 as a distance-measuring device using two photoreceptors including the first light receiving unit 54 and the second light receiving unit 57 will be described. The following arithmetic operations are performed by the arithmetic unit 90.

Figure 4:
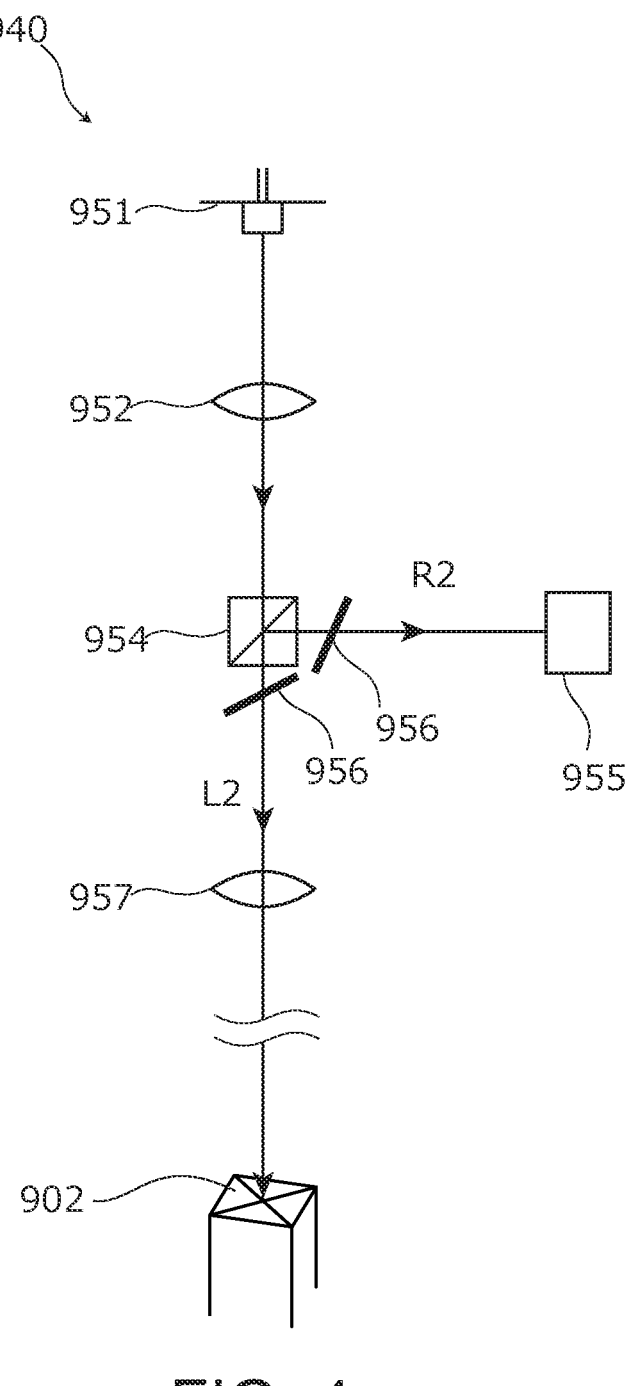
FIG. 4 illustrates an optical configuration of a conven- tional instrument height measuring unit (distance-measuring device).

In the distance-measuring device 940 having a conventional configuration as illustrated in FIG. 4, distance-measuring light and reference light are received by one light receiving unit 955. A distance Da to be measured by the distance-measuring device 940 is as follows.

Da=C/2□(TOptical path 1−TOptical path 2)

C: Light speed, T: Time of flight of light, Optical path 1: Reference light path, Optical path 2: Distance-measuring light path On the other hand, a distance D to be measured by the instrument height measuring unit 40 is as follows.

D=Da=C/2□(TOptical path 1−(TOptical path 2-DT))

□T=TReference−TOptical path 2

□T=Light reception time difference between first light receiving unit and second light receiving unit By correcting with □T, this method becomes equivalent to the conventional calculation method.

Therefore, first, by making a distance measurement of a distance-measuring object whose distance is already known by using the instrument height measuring unit 40, □T in the case of the known distance is calculated. This □T is stored as TReference in the memory of the arithmetic unit 90. By calculating □T and making correction each time a distance measurement is performed in the instrument height measuring unit 40, a distance measurement can be performed with accuracy equivalent to the accuracy of the conventional method.

Here, preferably, the light receiving elements of the first light receiving unit 54 and the second light receiving unit 57 have characteristics that are equivalent to each other. A photoelectric conversion time of an optical element has temperature characteristics, and the temperature characteristics differ depending on the light receiving element, however, by using light receiving units having temperature characteristics that are equivalent to each other, this difference is canceled, and a distance measurement can be performed with high accuracy. Specifically, as the first light receiving unit 54 and the second light receiving unit 57, the same products are preferably used, and the same products with the same model numbers are more preferably used. Further, this makes filtering and signal processing circuits unnecessary, so that the circuit scale can be made smaller.

Further, for the instrument height measuring unit 40, either the dToF method or the iToF method may be used. By using the TDC (Time to Digital Converter) technology that does not need high frequency for the dToF method and using a signal processing technology such as OC1-Burst for the iToF method, signal processing can be performed in a smaller circuit scale and at a comparatively low cost.

In the present embodiment, light to be emitted by the light transmitting unit 51 visible light, and distance-measuring light L irradiated toward a position below the surveying instrument 1 is also used as centering laser light. That is, the optical axis of the collimating lens 52 matches the centerline V of the vertical shaft 28, and the distance-measuring light L is emitted downward from the bottom surface of the surveying instrument 1, so that the distance-measuring light L irradiated toward a measuring object below the surveying instrument 1 is visually recognized as a laser centering point that serves as a guide below the vertical axis of the surveying instrument main body passing through the center point O. In the centering work, by aligning the irradiated laser centering point and the center of the measuring mark 2, the surveying instrument 1 can be disposed along a vertical axis of the measuring mark 2.

When a worker installs the surveying instrument 1 by using the measuring mark 2 as a reference point, the worker places the surveying instrument 1 substantially vertically above the measuring mark 2 by means of the tripod 8, and performs a leveling work to level the surveying instrument 1 by using the adjust screw of the leveling base 25. Then, a portion of light emitted from the light transmitting unit 51 is irradiated as distance-measuring light L toward the measuring mark 2, so that while maintaining a leveled state, the worker performs a positional adjustment by sliding the surveying instrument 1 so that the center of the measuring mark 2 matches a center of the distance-measuring light L irradiated toward the measuring mark 2. This centering work may cause the surveying instrument 1 to tilt from the horizontal state, and by repeating the leveling work and the centering work, the worker horizontally places the surveying instrument 1 vertically above the measuring mark 2. With the distance-measuring light L, the instrument height measuring unit 40 does not include a shutter and thus does not require switching of light paths, and can also successively calculate measurement values, so that at the time of the centering work, calculation of an instrument height T is also performed. The switching work is not required, and the centering work and the instrument height measuring work can be performed in parallel, so that the work to install the surveying instrument 1 can be efficiently performed.

In the present embodiment, the instrument height measuring unit 40 has not only the instrument height measuring function but also a centering laser light irradiating function for the centering work. Without limitation to this, the instrument height measuring unit 40 may have only the instrument height measuring function, and may be configured so as to perform the centering work separately. For the centering work, a conventional configuration, for example, a configuration including a centering telescope, can be used without problem.

In the present embodiment, the instrument height measuring unit 40 is disposed above the vertical shaft 28, and its optical members are also all disposed above the vertical shaft 28. Without limitation to this, some of the optical members of the instrument height measuring unit 40 may be disposed on the vertical shaft 28, the fixation portion 24, and the like, such as a configuration in which the light transmitting unit 51 is attached to the main body casing 12, and the collimating lens 52 and the objective lens 56 are disposed inside the hollow vertical shaft 28.

Preferred embodiments of the present invention have been described above, and the embodiments described above are just examples of the present invention, and can be combined based on the knowledge of a person skilled in the art, and such a combined embodiment is also included in the scope of the present invention.

REFERENCE SIGNS LIST

1: Surveying instrument
12: Main body casing (surveying instrument main body)

28: Vertical shaft
40: Instrument height measuring unit
51: Light transmitting unit
53: Beam splitter
54: First light receiving unit
57: Second light receiving unit
90: Arithmetic unit
L: Distance-measuring light
R: Reference light
T: Instrument height

The invention claimed is:

1. A surveying instrument including an instrument height measuring unit configured to make a distance measurement by irradiating light toward a position below a vertical axis of a surveying instrument main body, and calculate an instrument height, wherein the instrument height measuring unit comprises:

a light transmitting unit configured to emit light;

a beam splitter configured to be incident with light emitted from the light transmitting unit, split the incident light into reference light and distance-measuring light, send the reference light to a reference light path, and send the distance-measuring light to a distance-measuring light path;

a first light receiving unit configured to receive the reference light;

a second light receiving unit configured to receive light being the distance-measuring light that has been emitted toward a position below the vertical axis of the surveying instrument main body and returned by being reflected by a distance-measuring object; and an arithmetic unit configured to calculate the instrument height based on light reception signals generated by the first light receiving unit and the second light receiving unit, wherein the first and second light receiving units receive light from the same light transmitting unit.

2. The surveying instrument according to claim 1, wherein the light emitted by the light transmitting unit is visible laser light, and the distance-measuring light is irradiated as a laser centering point toward a position below the vertical axis of the surveying instrument main body.

3. The surveying instrument according to claim 2, wherein light receiving elements of the first light receiving unit and the second light receiving unit have equivalent temperature characteristics such that both units respond to temperature changes in the same manner.

4. The surveying instrument according to claim 1, wherein light receiving elements of the first light receiving unit and the second light receiving unit have equivalent temperature characteristics such that both units respond to temperature changes in the same manner.

\* \* \* \* \*